United States Patent
Terentiv et al.

(10) Patent No.: US 12,245,017 B2
(45) Date of Patent: Mar. 4, 2025

(54) METHODS, APPARATUS AND SYSTEMS FOR DIFFRACTION MODELLING BASED ON GRID PATHFINDING

(71) Applicant: Dolby International AB, Amsterdam (NL)

(72) Inventors: Leon Terentiv, Erlangen (DE); Daniel Fischer, Fuerth (DE); Christof Fersch, Neumarkt (DE); Panji Setiawan, Munich (DE)

(73) Assignee: Dolby International AB, Dublin (IE)

( * ) Notice: Subject to any disclaimer, the term of this patent is extended or adjusted under 35 U.S.C. 154(b) by 179 days.

(21) Appl. No.: 17/914,736

(22) PCT Filed: Mar. 29, 2021

(86) PCT No.: PCT/EP2021/058105
§ 371 (c)(1),
(2) Date: Sep. 26, 2022

(87) PCT Pub. No.: WO2021/198152
PCT Pub. Date: Oct. 7, 2021

(65) Prior Publication Data
US 2023/0188920 A1 Jun. 15, 2023

Related U.S. Application Data

(60) Provisional application No. 63/004,539, filed on Apr. 3, 2020.

(30) Foreign Application Priority Data

Apr. 3, 2020 (EP) .................................... 20167907

(51) Int. Cl.
*H04S 7/00* (2006.01)

(52) U.S. Cl.
CPC .................................. *H04S 7/302* (2013.01)

(58) Field of Classification Search
CPC ...... H04S 7/302; H04S 2400/11; A63F 13/54; G10K 15/02
(Continued)

(56) References Cited

U.S. PATENT DOCUMENTS 8,195,435 B2   6/2012   Bischoff
8,847,965 B2   9/2014   Chandak
(Continued)

FOREIGN PATENT DOCUMENTS

RU   2633134 C2   10/2017
RU   2656986 C1    6/2018
WO   2018128913 A1  7/2018

OTHER PUBLICATIONS

An, Inkyu et al "Diffraction-Aware Sound Localization for a non-Line-of-sight Source" IEEE, May 2019, pp. 1-7.
(Continued)

*Primary Examiner* — Yosef K Laekemariam

(57) ABSTRACT

Described herein is a method of processing audio content for rendering in a three-dimensional audio scene, wherein the audio content comprises a sound source at a source position, the method comprising: obtaining a voxelized representation of the three-dimensional audio scene, wherein the voxelized representation indicates volume elements in which sound can propagate and volume elements by which sound is occluded; generating a two-dimensional projection map for the audio scene based on the voxelized representation by applying a projection operation to the voxelized representation that projects onto a horizontal plane; and determining parameters indicating a virtual source position of a virtual sound source based on the source position, a listener position, and the projection map, to simulate, by rendering a virtual source signal from the virtual source position, an
(Continued)

impact of acoustic diffraction by the three-dimensional audio scene on a source signal of the sound source at the source position. Described are moreover a corresponding apparatus as well as corresponding computer program products.

17 Claims, 5 Drawing Sheets

(58) Field of Classification Search
USPC .......................................................... 381/1
See application file for complete search history.

(56) References Cited

U.S. PATENT DOCUMENTS

| | | |
|---|---|---|
| 9,510,125 B2 | 11/2016 | Raghuvanshi |
| 9,977,644 B2 | 5/2018 | Schissler |
| 10,248,744 B2 | 4/2019 | Schissler |
| 10,251,013 B2 | 4/2019 | Bygrave |
| 10,293,259 B2 | 5/2019 | Ballard |
| 11,070,933 B1* | 7/2021 | Schroeder ................ H04R 5/04 |
| 2015/0294041 A1 | 10/2015 | Yeh |
| 2015/0326966 A1 | 11/2015 | Mehra |
| 2015/0378019 A1 | 12/2015 | Schissler |
| 2016/0109284 A1 | 4/2016 | Hammershøi |
| 2017/0165575 A1 | 6/2017 | Ridihalgh |
| 2017/0358127 A1 | 12/2017 | Lindahl |
| 2018/0359591 A1* | 12/2018 | Bygrave ................ H04S 7/303 |
| 2019/0356999 A1 | 11/2019 | Raghuvanshi |

OTHER PUBLICATIONS

Beig, M. et al "G-SpAR: GPU-Based Voxel Graph Pathfinding for Spatial Audio Rendering in Games and VR" IEEE Aug. 2019.
Chaitanya, C. R. Alla, et al "Adaptive Sampling for Sound Propagation" IEEE Transactions on Visualization and Computer Graphics, vol. 25, No. 5, May 2019, pp. 1846-1854.
Kapralos, B. et al "Diffraction Modeling for Interactive Virtual Acoustical Environments" Jan. 2007, Research Gate.
Tsingos, N. e al "Modeling Acoustics in Virtual Environments Using the Uniform Theory of Diffraction" SIGGRAPH Aug. 2001.

* cited by examiner

METHODS, APPARATUS AND SYSTEMS FOR DIFFRACTION MODELLING BASED ON GRID PATHFINDING

CROSS-REFERENCE TO RELATED APPLICATIONS

This application claims priority of the following priority applications: US provisional application 63/004,539 (reference: D20016USP1), filed 3 Apr. 2020 and EP application 20167907.3 (reference: D20016EP), filed 3 Apr. 2020, which are hereby incorporated by reference.

TECHNOLOGY

The present disclosure generally relates to a method of processing audio content for audio rendering in a three-dimensional audio scene, taking into account diffraction effects caused by elements of the three-dimensional audio scene. In particular, the present disclosure relates to a method of (acoustic) diffraction modelling based on grid pathfinding. The present disclosure further relates to corresponding apparatus and computer program products.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Acoustic diffraction refers to various phenomena that occur when a wave encounters an obstacle or a hole in occluder. The psychoacoustical perception of acoustic diffraction is the "bending" of sound around an obstacle or the "spreading out" past a small opening in sound barrier. This explains why one can still perceive the sound well inside a concert hall despite being obstructed by a column or a pole; or one can hear the sound coming from a room with slightly open door while being in a corridor.

Acoustic diffraction is a naturally occurring phenomenon, which is playing an important role in delivering the correct interpretation of acoustic environments. Especially, it is perceptually relevant in the presence of occluding sound barriers and/or small openings in them. Absence of simulation of the acoustic diffraction effect certainly undermines realistic reproduction of sound scenes.

Despite the importance of acoustic diffraction in the physical world, diffraction modelling in virtual environments (e.g. virtual reality or game worlds) is often overlooked. Modelling of acoustic diffraction effects is often completely discarded or substituted by a direct signal propagation approach. Even advanced state-of-the-art audio rendering solutions are still not reaching a state in which realistic acoustic effects can be accurately reproduced in three-dimensional virtual environments in real-time. One reason is that physically appropriate modeling of diffraction effects is a computationally intensive task. This is due to complexity of representation of occlusion/diffraction relevant object geometry (e.g., walls and holes), dimensionality of space for audio rendering (e.g., 3D Virtual Reality), and requirements on realism and content creator intent for modeled effects (e.g., audibility range).

Accordingly, there is an existing need for realistic, yet computationally feasible modeling of acoustic diffraction. In other words, there is need for an improved method and apparatus for processing audio content for rendering in a (virtual) three-dimensional audio scene.

SUMMARY

In accordance with a first aspect of the present disclosure there is provided a method of processing audio content for rendering in a three-dimensional audio scene. The three-dimensional audio scene may be a virtual audio scene. The audio content may include a sound source at a source position. The method may include obtaining a voxelized representation of the three-dimensional audio scene. The voxelized representation may indicate volume elements (e.g., voxels) in which sound can propagate and volume elements (e.g., voxels) by which sound is occluded. As such, the voxelized representation may be said to include a description of an occluding geometry of the three-dimensional audio scene. In some embodiments, the volume elements (e.g., voxels) in the voxelized representation may be cubes of a predefined edge length, e.g., about 10 centimeters. In other embodiments, the volume elements (e.g., voxels) may have an adaptive size, i.e., adaptive edge length. Volume elements in which sound can propagate (e.g., freely propagate) may be considered as air-filled. In some implementations, the volume elements may have associated occlusion coefficients ranging from a coefficient value indicating free sound propagation (e.g., 0) to full occlusion (e.g., 1). The method may further include obtaining a two-dimensional projection map for the audio scene. The two-dimensional projection map may be related to the voxelized representation by a projection operation that projects onto a horizontal plane. This projection map may include a grid with each element of the grid representing a horizontal position in the audio scene and indicating whether at least one volume element at (e.g., above or below) that horizontal position in the voxelized representation is a volume element in which sound can propagate. The projection map may also be referred to as an occlusion map or propagation map. The method may further include determining parameters indicating a virtual source position of a virtual sound source based on the source position, a listener position, and the projection map, to simulate, by rendering a virtual source signal from the virtual source position, an impact of acoustic diffraction by the three-dimensional audio scene on a source signal of the sound source at the source position.

By considering a voxelized representation of the three-dimensional audio scene, complexity of representation can be significantly reduced. For appropriate choice of the voxel size (e.g., about 10 centimeter edge length, or few centimeters edge length), this can be achieved without perceivable degradation of listening experience. By further projecting onto the two-dimensional projection map, complexity can be further reduced, thereby allowing two-dimensional path finding algorithms to be employed. The path output by the path finding algorithm contains sufficient information for generation of a virtual sound source at a virtual source position that realistically simulates the impact of sound diffraction in the original three-dimensional audio scene. By virtue of the complexity reduction achieved by the proposed method, this allows to provide a realistic listening experience in a three-dimensional audio scene at reasonable computational effort. In particular, this enables realistic sound rendering in three-dimensional audio scenes even for real time applications, such as virtual reality applications or computer/console games.

In some embodiments, obtaining the two-dimensional projection map may include generating the two-dimensional projection map based on the voxelized representation by applying the projection operation that projects onto the horizontal plane to the voxelized representation. If the volume elements have associated occlusion coefficients, generating the projection map may involve a truncation step that maps any of these coefficient values to one of the two extremal values (e.g., to 0 or 1). Depending on circumstances (e.g., how often the geometry is expected to change), the voxelized representation and the two-dimensional projection map may be precomputed (e.g., for a plurality of sizes of volume elements) and may be accessed when necessary. For example, precomputation may be performed on the encoder side, and the voxelized representation(s) and the two-dimensional projection map(s) may be provided to the decoder side as part of a bitstream. This may further reduce the computational load at the decoder side.

In some embodiments, determining the parameters indicating the virtual source position may include applying a path finding algorithm to the projection map to determine a path in the projection map between a two-dimensional projection of the source position (e.g., a grid element containing the source position) and a two-dimensional projection of the listener position (e.g., a grid element containing the listener position), along grid elements indicating that at least one volume element at a respective horizontal position in the voxelized representation is a volume element in which sound can propagate. These grid elements may be referred to as non-occluding grid elements.

A broad range of reliable and efficient path finding algorithms are readily available and can be chosen from, depending on the specific requirements of the rendering environment. Thereby, the proposed method can be specifically tailored to the computational capabilities that are present at the rendering side, by appropriate choice of the path finding algorithm.

In some embodiments, determining the parameters indicating the virtual source position may include calculating a line of sight between the source position and the listener position in the three-dimensional audio scene. Said determining may further include, if the calculated line of sight intersects a volume element in the voxelized representation by which sound is occluded, and if a two-dimensional projection of the line of sight onto the horizontal plane intersects a grid element in the projection map indicating that none of the volume elements at that horizontal position in the voxelized representation is a volume element in which sound can propagate, applying a path finding algorithm to determine a path in the projection map between a two-dimensional projection of the source position and a two-dimensional projection of the listener position, along grid elements indicating that at least one volume element at a respective horizontal position in the voxelized representation is a volume element in which sound can propagate. Under the above conditions, said determining may further include determining the parameters indicating the virtual source position based on the determined path. It is understood that the above sub-steps of said determining step may imply respective determination steps of whether there is an intersection in the voxelized representation and/or in the projection map.

By performing a check as to whether the direct line of sight intersects occluding voxels in the voxelized representation or occluding grid elements in the projection map, special cases that are simple to handle can be identified for special treatment, thereby further reducing the overall computational load.

In some embodiments, the method may further include, if the path finding algorithm fails to identify a path in the projection map between the two-dimensional projection of the source position and the two-dimensional projection of the listener position, a step of obtaining a refined voxelized representation and a refined two-dimensional projection map. Under the above condition, the method may further include applying the path finding algorithm to determine a path in the refined projection map between the two-dimensional projection of the source position and the two-dimensional projection of the listener position, along grid elements indicating that at least one volume element at a respective horizontal position in the refined voxelized representation is a volume element in which sound can propagate. The refined two-dimensional projection map may be related to the refined voxelized representation by the projection operation that projects onto the horizontal plane. Further, the volume elements of the refined voxelized representation may have a smaller edge length than the volume elements of the voxelized representation. For example, the edge length of the volume elements of the refined voxelized representation may have half the edge length of the volume elements of the (initial/previous) voxelized representation. Whether or not the refined voxelized representation and the refined two-dimensional projection map are obtained may depend on whether there is still time (e.g., CPU time) in a present cycle (e.g., time period) of the rendering procedure. For example, the cycle length may relate to a desired (e.g., predetermined) refresh rate (update rate) of the audio rendering. If CPU time is available, the representation may be refined, otherwise, the sound from the sound source may not be rendered at all if no path has been found.

Thereby, the accuracy of representation can be successively increased. If a "coarse" representation yields acceptable results in the sense that a path is found and determination of the virtual source position of the virtual sound source is possible, the coarse representation may be maintained. On the other hand, if such path is not found (and CPU time is available), the granularity of the voxelized representation is refined to check whether there is an opening in the occluding geometry that has not been identified at the coarser granularity but that would allow for the sound from the sound source to be perceived at the listener position. In consequence, the proposed conditional refinement allows to achieve an optimum trade-off between accuracy of representation and reduction of computational load.

In some embodiments, determining the parameters indicating the virtual source position may include determining a distance and an azimuth angle between the listener position and the virtual source position based on the determined path. Therein, the distance may be determined based on a path length of the determined path. For example, the distance may be determined as the path length (e.g., the actual length of the path or an estimate/approximation thereof, such the 'Manhattan' distance or a weighted number voxels intersected by the path) of the (complete) determined path. Alternatively, the path length of the determined path may be adjusted based on a difference in vertical coordinates of the listener position and the source position, or based on an extrapolation into the voxelized representation. Determining the azimuth angle may include identifying, starting from the two-dimensional projection of the listener position, a nearest direction change in the determined path. Determining the azimuth angle may further include determining the azimuth angle as an azimuth angle between the two-dimensional projection of the listener position and the identified nearest direction change. Here, it is understood that the (nearest) direction change is caused by a volume element by which sound is occluded.

Thereby, the fact is exploited that the determined path in the projection map contains sufficient information for efficiently determining a distance and an azimuth angle for the virtual source position that will produce a realistic listening experience upon rendering.

In some embodiments, determining the parameters indicating the virtual source position may include determining an elevation angle between the listener position and the virtual source position based on the determined path and the voxelized representation. Therein, determining the elevation angle may include identifying, starting from the two-dimensional projection of the listener position, a nearest direction change in the determined path. Determining the elevation angle may further include determining, at the horizontal position of the identified direction change, a volume element in which sound can propagate in the voxelized representation. Here, that volume element in which sound can propagate at the horizontal position of the determined direction change may be determined that has a vertical coordinate closest to that of the listener position, that has a smallest distance to the direct line of sight between the listener position and the sound source position, or that is within a largest contiguous subset of voxels in which sound can propagate. Determining the elevation angle may further include determining the elevation angle as an elevation angle between the listener position and the determined volume element.

Thereby, the fact is exploited that the determined path in the projection map, together with the voxelized representation, contains sufficient information for efficiently determining an elevation angle for the virtual source position that will produce a realistic listening experience upon rendering.

In some embodiments, determining the parameters indicating the virtual source position may include calculating a line of sight between the source position and the listener position in the three-dimensional audio scene. Determining the parameters indicating the virtual source position may further include, if the calculated line of sight intersects a volume element in the voxelized representation by which sound is occluded, and if a two-dimensional projection of the line of sight onto the horizontal plane does not intersect a grid element in the projection map indicating that none of the volume elements at that horizontal position in the voxelized representation is a volume element in which sound can propagate, determining a distance and an azimuth angle between the listener position and the virtual source position based on the two-dimensional projection of the line of sight onto the horizontal plane. It is understood that it is not necessary to determine a virtual source position if the calculated line of sight does not intersect a volume element in the voxelized representation by which sound is occluded (in that case, the original source position can be used), or if no path in the projection map is found (in this case, no sound would need to be rendered at all).

Thereby, a specific trivial case can be identified and treated in a simple manner, to further reduce the overall computation load incurred by the proposed method while still yielding a realistic listening experience.

In some embodiments, determining the parameters indicating the virtual source position may further include determining an elevation angle between the listener position and the virtual source position based on the line of sight and the voxelized representation. Therein, determining the elevation angle may include identifying, starting from the listener position, a nearest volume element that is intersected by the calculated line of sight and by which sound is occluded. Determining the elevation angle may further include determining, at the horizontal position of the identified volume element, a volume element in which sound can propagate in the voxelized representation. Determining the elevation angle may yet further include determining the elevation angle as an elevation angle between the listener position and the determined volume element.

Thereby, the fact is exploited that in the identified special case, the direct line of sight, together with the voxelized representation, contains sufficient information for efficiently determining an elevation angle for the virtual source position that will produce a realistic listening experience.

In accordance with another aspect of the present disclosure there is provided an apparatus comprising a processor coupled to a memory storing instructions for the processor. The processor may be adapted to cause the apparatus to perform the method according to the above aspect and any of its embodiments.

In accordance with another aspect of the present disclosure there is provided a computer program including instructions for causing a processor that carries out the instructions to perform the method according to the above first aspect and any of its embodiments.

In accordance with yet another aspect of the present disclosure there is provided a computer-readable storage medium storing the computer program according to the foregoing aspect.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Figure 1A:
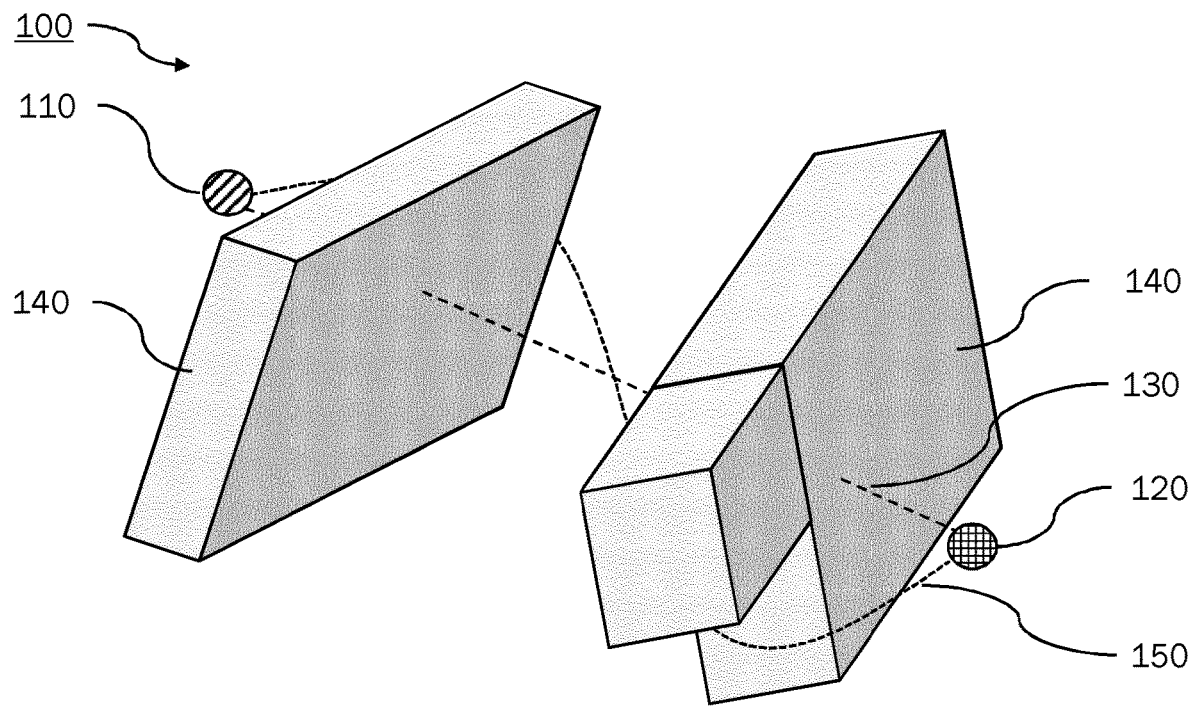
FIG. 1A and FIG. 1B illustrate an example of an acoustic diffraction scenario caused by occluding elements in a three-dimensional audio scene and its two-dimensional horizontal projection on a two-dimensional voxelization grid, respectively.
Figure 1B:
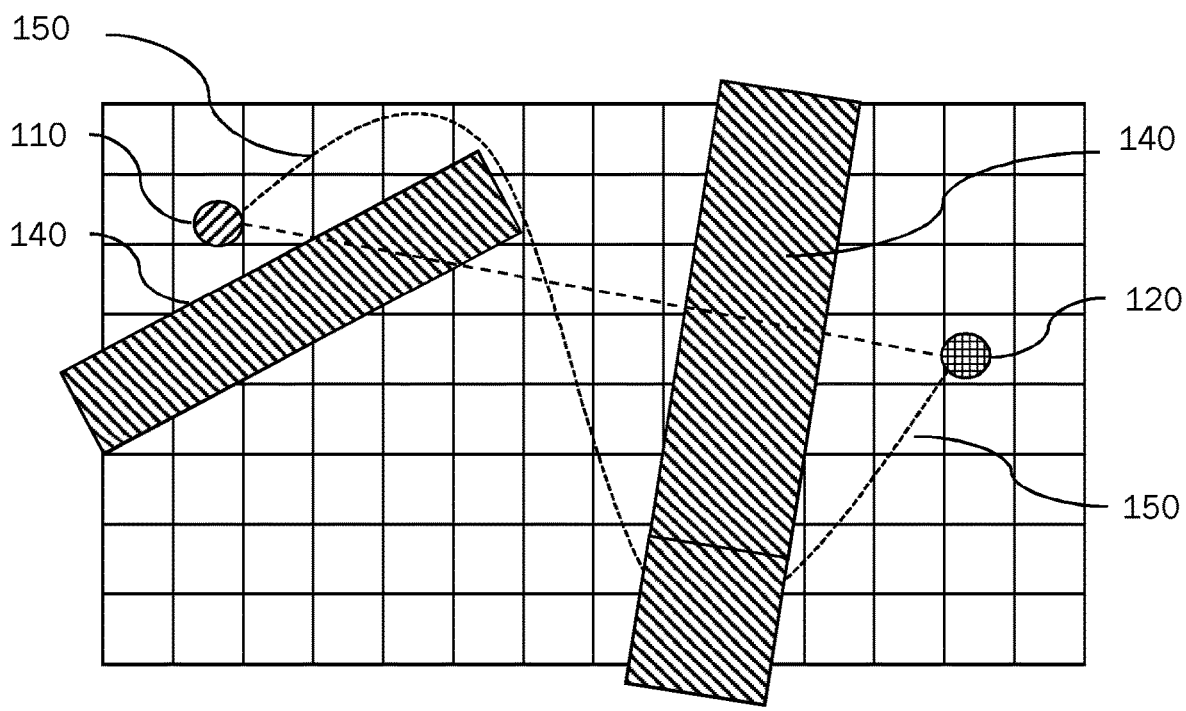

FIG. 1A provides an example of a three dimensional audio scene 100 and FIG. 1B depicts its horizontal projection onto a two-dimensional projection plane. This audio scene illustrates the effect of acoustic diffraction of sound emitted at a source position (source location) 110 when perceived at a listener position (listener location) 120. A direct path 130 between the source position 110 and the listener position 120 is blocked by the occluding elements 140 in the audio scene, such as walls or other extended elements between the source position 110 and the listener position 120. Still, the sound emitted at the source position 110 will be perceived at the listener position 120. This is due to acoustic diffraction, which allows the sound to reach the listener position 120 also along all paths around the occluding elements 140. The shortest "bent" path 150 can be considered as dominant path from the psychoacoustical point of view. This effect needs to be appropriately modeled to allow for realistic audio rendering in (virtual) three-dimensional audio scenes including occluding elements.

Broadly speaking, the present disclosure proposes a computationally efficient method of acoustic diffraction modelling based on pathfinding algorithms for equidistant grids representing voxelized occluding geometry of a three-dimensional (audio) scene. To achieve this aim, the present disclosure utilizes a simplified (but sufficiently accurate) geometry representation using a voxelization method (e.g., an adaptive voxelization method). Further, the present disclosure uses a two-dimensional space for diffraction modelling by contracting of the relevant geometry representation, possibly together with means to control sound effects approximating acoustical occlusion/diffraction phenomena for content creators and encoder operators.

Accordingly, methods and apparatus according to the present disclosure allow for perceptually realistic acoustic occlusion/diffraction effect simulation for dynamic and interactive three-dimensional virtual environments and aim to enhance overall user experience and promote a broader deployment of virtual reality (VR) applications. Here and in the following, "simulation of occlusion/diffraction" may be understood in the sense of modelling the perceptual effect of occlusion/diffraction, and may not necessarily imply accurate simulation of physical effects.

As a starting point, the present disclosure assumes a (virtual) three-dimensional space (e.g., three-dimensional audio scene) containing an occluding geometry description (i.e., information on occluding elements in the audio scene, for example represented in terms of meshes or geometric primitives and possibly occlusion coefficients obtained for or assigned to their faces). The present disclosure further assumes a position (location) of listener(s)/user(s) and audio source(s), as well as audio signal(s) (e.g., waveforms) emitted by the audio source(s). These elements may be seen as an input to methods proposed by embodiments of the disclosure. It should however be noted that these methods may likewise receive a processed version of the occluding geometry description. For instance, the methods may receive, as an input, a voxelized representation of the three-dimensional space (e.g., three-dimensional audio scene).

Based on the above assumptions (i.e., the above input), methods and apparatus according to embodiments of the present disclosure seek to simulate the perceptual effect of acoustic occlusion/diffraction by providing (e.g., determining or generating) a virtual audio source (virtual sound source) at a virtual source position, possibly together with a virtual source signal. Therein, the virtual source position is defined by its coordinates, including a distance (e.g., radius) and a direction (e.g., azimuth (angle) and elevation (angle)). It should however be noted that the virtual source position may likewise be defined using other coordinate representations (e.g. in a Cartesian coordinate system) and that the present disclosure shall not be limited to spherical coordinates. In case positions/locations are expressed in a coordinate system that is different from the coordinate system used for sound rendering, an appropriate transformation step between coordinate systems may be performed, for example at the time of audio rendering. The virtual source signal can be determined based on the original waveform of the source signal, possibly with imposed modifications thereon (e.g., gains, filters, etc.).

Figure 2:
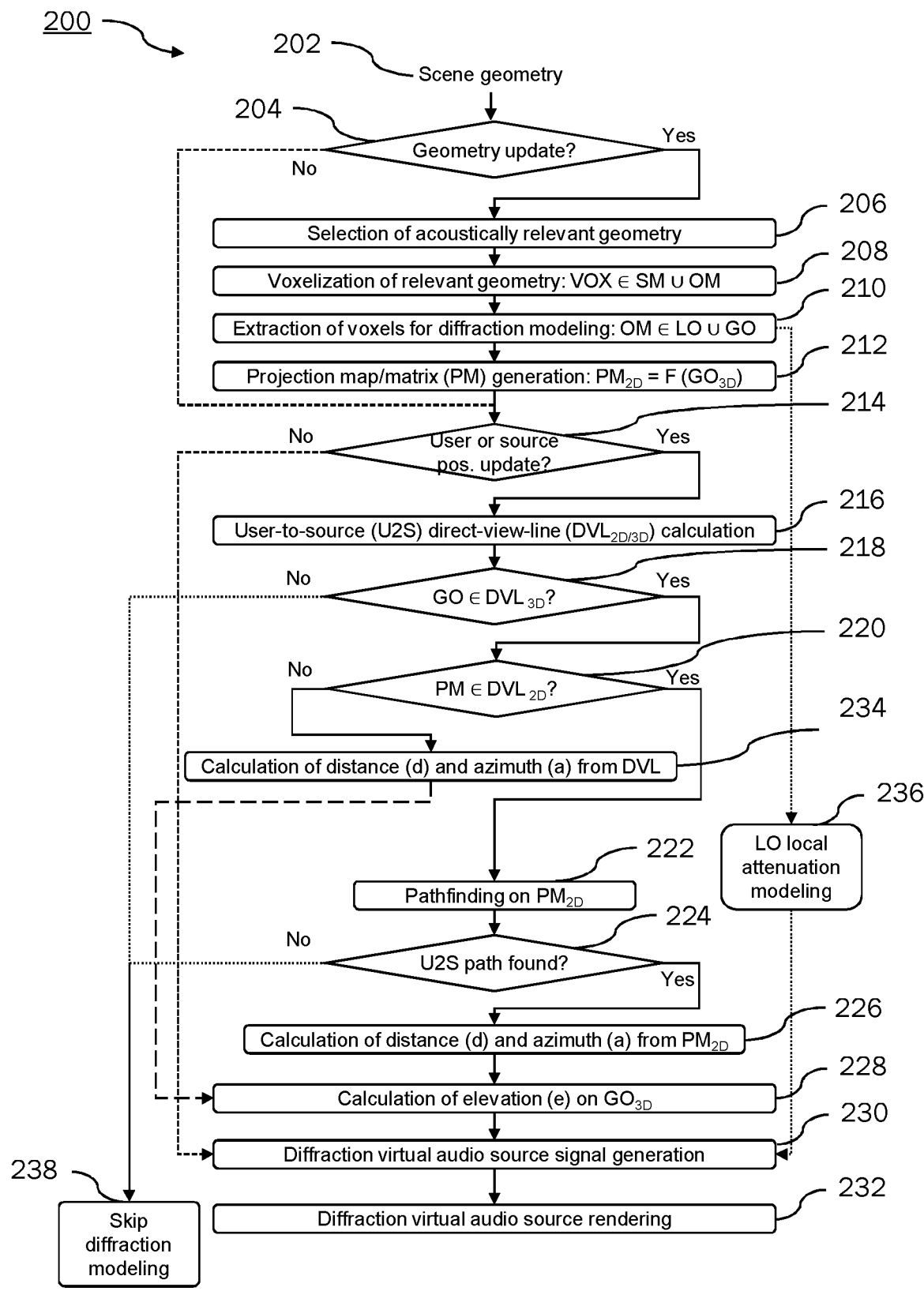
FIG. 2 illustrates a flow diagram of an example of a method of processing audio content for rendering in a three-dimensional audio scene.

FIG. 2 illustrates a flow diagram of an example of a method 200 of processing audio content for rendering in a three-dimensional audio scene. The audio content comprises a sound source at a source position that emits a (sound) source signal, i.e., that emits sound (e.g., a source waveform) based on the source signal.

At 202, a scene geometry is received as an input. The scene geometry may relate to a meshed representation of a three-dimensional audio scene (three-dimensional audio environment). The meshed representation comprises a mesh or set of meshes that represent faces of objects (elements of the scene), such as local occluders (e.g., obstacles) or global occluders (e.g., walls), for example, in the three-dimensional audio scene. In some implementations, each mesh or mesh face may have an associated occlusion coefficient.

At 204, it is determined whether an update of the scene geometry and/or the corresponding occlusion properties has occurred. If so (Yes), the method proceeds to 206 to determine a voxelized representation of the three-dimensional audio scene or to at least update a sub-part of the voxelized representation based on an updated sub-part of the scene geometry (e.g., in case the voxelized representation is already available and a change in the scene geometry is comparatively small), followed by generating a two-dimensional projection map of the voxelized representation at 208. Otherwise (No), the method proceeds to 214.

At 206, a selection of acoustically relevant geometry is performed. Accordingly, a sub-set of acoustically relevant data representing objects (with dimensions and types that can/should cause occlusion/diffraction effects) is selected from all available scene geometry information. This step may be optional.

At 208, voxelization (i.e., a voxelization method/algorithm) is applied to the scene geometry or the acoustically relevant geometry (e.g., occlusion/diffraction relevant geometry) to generate a voxelized representation of the three-dimensional audio scene. The voxelized representation comprises a plurality of voxels (volume elements) of regular size, arranged in a regular three-dimensional grid. As such, the voxels may be cubes of a predefined edge length, e.g., about 10 centimeters.

In one example implementation, a voxelization algorithm may be applied to the meshed representation of the three-dimensional audio scene to generate the voxelized representation. This step includes reducing the representation complexity of the geometry by a 3D voxelization method/algorithm (e.g., adaptive 3D voxelization method/algorithm) that splits the three-dimensional space into two (abstract) classes of voxels (volume elements), namely occluder object material (OM) voxels, such as concrete, or wood, and sound propagation medium (SM) voxels such as air or water. Accordingly, the full set of voxels VOX is given by the sets of OM voxels and SM voxels, $$\text{VOX} = \text{OM} \cup \text{SM} \quad (1)$$

At 210, voxels for diffraction modeling are extracted/selected. To this end, the OM voxels are split into two groups of voxels, namely locally occluding (LO) voxels (corresponding to locally occluding obstacles, such as furniture, for example) and globally occluding (GO) voxels (corresponding to globally occluding barriers, such as walls, for example). It is assumed that locally occluding obstacles do not have an impact on large-scale directivity of sound propagation, so that sound from a sound source behind a locally occluding obstacle propagates, possibly somewhat attenuated, in the same direction as the original sound, at least for sufficient distances from the locally occluding obstacle. Accordingly, the set of OM voxels is split via $$OM = LO \cup GO \qquad (2)$$

Subsequent steps of method 200 may then only consider the GO voxels. Thus, put differently, step 210 involves removing, from the generated voxelized representation, any voxels that correspond to local occluders, wherein local occluders represent objects in the three-dimensional audio scene that are expected to not have an impact on large-scale directivity of sound propagation. For instance, boundaries of the three-dimensional audio scene (e.g., walls) are global occluders that should be retained at this point. Local occluders may be identified by applying image processing techniques (e.g., including filtering) to the generated voxelized representation, assuming for example that local occluders will be removed by appropriate spatial filtering. Local occluders may also be identified based on spatial properties of OM voxels (e.g., the number and/or size of voxels representing an occluding obstacle) and/or their relationship to surrounding SM voxels (e.g., free volume for sound propagation). Likewise, local occluders may be directly specified by the corresponding metadata and reflect audio scene creator intent. Notably, step 210 may be optional.

Steps 206, 208, and 210 may be said to aim at controllably reducing a complexity of the geometry representation of the three-dimensional audio scene by determining a significance of geometry elements in respect to a strength of occlusion/diffraction effects caused by them.

In some implementations, steps 206, 208, and 210 may be replaced by obtaining a voxelized representation of the three-dimensional audio scene in different manner, for example by receiving the voxelized representation from an external source. For instance, the voxelized representation may be read from a storage memory, or may be extracted (e.g., decoded) from a bitstream. In these cases, step 202 would be omitted as well. In general, it may be said that method 200 comprises a step of obtaining a voxelized representation of the three-dimensional audio scene, wherein the voxelized representation indicates volume elements in which sound can propagate (e.g., SM voxels) and volume elements by which sound is occluded (e.g., OM voxels). Voxels in which sound can propagate (e.g., freely propagate) may be considered as air-filled. In some implementations, as described above, this step may be implemented by steps 206, 208, and 210. Obtaining the voxelized representation of the three-dimensional audio scene may be subject to whether an update of the three-dimensional audio scene has occurred.

The impact of any voxels that are removed from the voxelized representation at step 210 may be taken into account at optional step 236 by applying local attenuation modeling to simulate attenuation of sound by the removed voxels corresponding to local occluders, in dependence on the listener position. Any attenuation gain or filter determined at this step may be applied to the virtual source signal determined at 230 and described below.

At 212, a two-dimensional projection map (or projection matrix) for diffraction modeling is generated (e.g., calculated) from the voxelized representation (e.g., from the GO voxels). For instance, the two-dimensional projection map for the audio scene may be generated based on the voxelized representation by applying a projection operation to the voxelized representation. The projection operation projects onto a horizontal (e.g., horizontal from a listener point of view) plane. In consequence, the projection map comprises a grid with each element of the grid representing a horizontal position in the audio scene and indicating whether at least one voxel (volume element) at that horizontal position (e.g., above, in, or below the horizontal plane) in the voxelized representation is a voxel in which sound can propagate (e.g., is a SM voxel, or equivalently, is not a GO voxel). As such, the projection map may also be referred to as propagation map or occlusion map.

In some implementations, the two-dimensional projection map (projection matrix) may be obtained from the three-dimensional voxelized representation (three-dimensional voxel group matrix), or the part thereof that represents globally occluding barriers, using the following contraction method:

$$PM_{x,y} = \min_{z}(GO_{x,y,z}) \qquad (3)$$

Here, values of PM and GO may belong to a range between extremal values indicating free sound propagation (no occlusion; e.g., value 0) and full occlusion (e.g., value 1), respectively. For instance, values of PM and GO may belong to the range [0, 1] and correspond to 0—no occlusion
1—full occlusion.

Needless to say, also the reverse assignment of values would be feasible, in which case Equation (3) would have to be adapted by replacing min by max.

For values of PM and GO in the range [0, 1], an optional truncation step may be performed in the context of generating the projection map to render the entries of the projection map to Boolean type as follows:

$$PM_{x,y} = \left(\min_{z}(GO_{x,y,z}) > \gamma\right) \qquad (4)$$

where $\gamma \in (0, 1)$ is occlusion threshold. In general, generating the projection map may involve a truncation step that maps any of occlusion coefficient values of the voxels of the voxelized representation to one of the two extremal values (e.g., to 0 or 1). Put differently, generating the two-dimensional projection map may involve a truncation operation so that the grid elements of the projection map either indicate free sound propagation (no occlusion) or full occlusion (occlusion).

On the other hand, also the case is feasible that the occlusion coefficient values of the voxels of the voxelized representation (e.g., values of GO) are already of Boolean type. In this case the PM matrix may be obtained as follows:

$$VOX_{x,y,z} \in PM_{x,y} \text{ if for } \forall z: VOX_{x,y,z} \in GO_{x,y,z}(\forall - \text{all})$$

Step 212 may be said to aim at reducing dimensionality of space for diffraction modelling by introduction of the PM matrix to represent the concept of "walls and holes". Indeed, if sound propagation is possible for any of the voxels at a given horizontal position (i.e., in the "column" of voxels at that horizontal position), the projection map will indicate that sound propagation is possible for that horizontal position (i.e., for that grid element), and thus indicate at least a "hole" at that horizontal position.

Generating the two-dimensional projection map may be subject to whether an update of the three-dimensional audio scene has occurred.

In some implementations, step 212 may be replaced by obtaining a two-dimensional projection map in a different manner, e.g., by receiving the two-dimensional projection map from an external source. For instance, the two-dimensional projection map may be read from a storage memory, or may be extracted (e.g., decoded) from a bitstream. In general, it may be said that method 200 comprises a step of obtaining a two-dimensional projection map for the audio scene, wherein the two-dimensional projection map is related to the voxelized representation by a projection operation that projects onto a horizontal plane. The projection map comprises a grid with each element of the grid representing a horizontal position in the audio scene and indicating whether at least one volume element at that horizontal position in the voxelized representation is a volume element in which sound can propagate. In some implementations, as described above, this step may be implemented by step 212, for example in the sense that obtaining the two-dimensional projection map comprises applying the projection operation to the voxelized representation. Still, obtaining the two-dimensional projection map may be subject to whether an update of the three-dimensional audio scene has occurred.

At 214, it is determined whether an update of a listener position and/or the source position has occurred. If so (Yes), the method proceeds to 216 to determine parameters indicating a virtual source position of a virtual sound source. Otherwise (No), the method proceeds to 230, using a previously determined virtual source position.

In general, determining the parameters indicating the virtual source position of the virtual sound source is performed based on the (original) source position, the listener position, and the projection map. In some cases, the determination may further be based on the voxelized representation. The aim of determining the virtual source position of the virtual sound source is to simulate, by rendering a virtual source signal from the virtual source position, an impact of acoustic diffraction by the three-dimensional audio scene on a source signal of the sound source at the (original) source position.

Determining the parameters indicating the virtual source position may be implemented by some or all of steps 216, 218, 220, 222, 224, 226, 228, and 234 discussed below. In general, this step may be said to involve applying a path finding algorithm to the projection map to determine a path in the projection map between a two-dimensional projection of the source position (e.g., a grid element including that position) and a two-dimensional projection of the listener position (e.g., a grid element including that position), along grid elements indicating that at least one volume element at a respective horizontal position in the voxelized representation is a volume element in which sound can propagate (e.g., non-occluding grid elements).

As noted above, determining the parameters indicating the virtual source position of the virtual sound source may be subject to whether an update of the listener position and/or the source position has occurred.

At 216, a line of sight between the source position and the listener position in the three-dimensional audio scene is calculated. This line of sight may also be referred to as a listener-to-source (user-to-source) direct-view-line. Its calculation may involve common geometric calculations. In some implementations, the listener position and/or the source position may be quantized to the center of the respective voxel in which they are located. The line of sight may be a line of sight in three-dimensional space.

At 218, it is checked whether the calculated line of sight intersects a voxel in the voxelized representation by which sound is occluded (e.g., a GO voxel). If so (Yes), the method proceeds to 220. Otherwise (No), the method proceeds to 238. In the latter case, diffraction modelling is not necessary, since there is a direct line of sight between the sound source and the listener.

At 220, it is checked whether a two-dimensional projection of the line of sight onto the horizontal plane (of the projection map) intersects a grid element in the projection map indicating that none of the volume elements at that horizontal position in the voxelized representation is a volume element in which sound can propagate (e.g., a PM element indicating occlusion, such as $PM_{x,y}=1$). If so (Yes), the method proceeds to 222. Otherwise (No), the method proceeds to 234. In the latter case, pathfinding in the projection map is not necessary, as there is a direct (straight) line between 2D projections of the source and listener positions.

Steps 218 and 220 aim to reduce the amount of computation that is necessary for determining the parameters indicating the virtual source position. This is achieved by special treatment of simple or trivial cases. Steps 218 and 220 may be optional in some implementations, noting that the general treatment would yield reasonable results also for the simple or trivial cases.

At 222, a path finding algorithm is applied to determine a path in the projection map between a two-dimensional projection of the source position and a two-dimensional projection of the listener position, along grid elements indicating that at least one volume element at a respective horizontal position in the voxelized representation is a volume element in which sound can propagate (e.g., non-occluding grid elements). In some implementations, the listener position and/or the source position may be quantized to the center of the projection (e.g., grid element) of the voxel in which they are respectively located. Any pathfinding algorithm may be applied at this step, including, for example, A* and JPS. In this sense, the proposed model is modular with regard to the path finding algorithm.

In one example implementation, step 222 may comprise the following sub-steps:
Calculation of voxel indices (voxels) corresponding to listener (user) and source (object) positions: $VOX_{listener}$ and $VOX_{source}$.
Optionally, checking whether $VOX_{listener} \in SM$, $VOX_{source} \in SM$ (i.e., whether the listener and the source position are within sound propagating material), $VOX_{listener}=VOX_{source}$ (in which case spatial audio rendering could be skipped), $\|VOX_{object}-VOX_{user}\|>\Delta$ (in which case spatial audio rendering could be skipped as well, assuming that the source is too far from the listener to be perceived), etc. and applying corresponding rules.
Running a pathfinding algorithm (e.g., A*, JPS, etc.) to obtain a path (e.g., approximating a shortest trajectory from the source to the listener). The following parameters may be applied for its control (e.g., acceleration and search loop termination):
heuristic parameters for the pathfinding algorithm
a previously detected path (e.g., for a dynamic scenario)
threshold(s) on computation time and/or on a number of recourses
threshold for a maximal path length expressed in terms of, for example, a number of 2D grid elements (2D projections of voxels), distance units, sound attenuation, resulting source object sound level, etc.

As described above, step 222 is performed if the calculated line of sight intersects a volume element in the voxelized representation by which sound is occluded, and if the two-dimensional projection of the line of sight onto the horizontal plane intersects a grid element in the projection map indicating that none of the volume elements at that horizontal position in the voxelized representation is a volume element in which sound can propagate (e.g., an occluding grid element).

Figure 4:
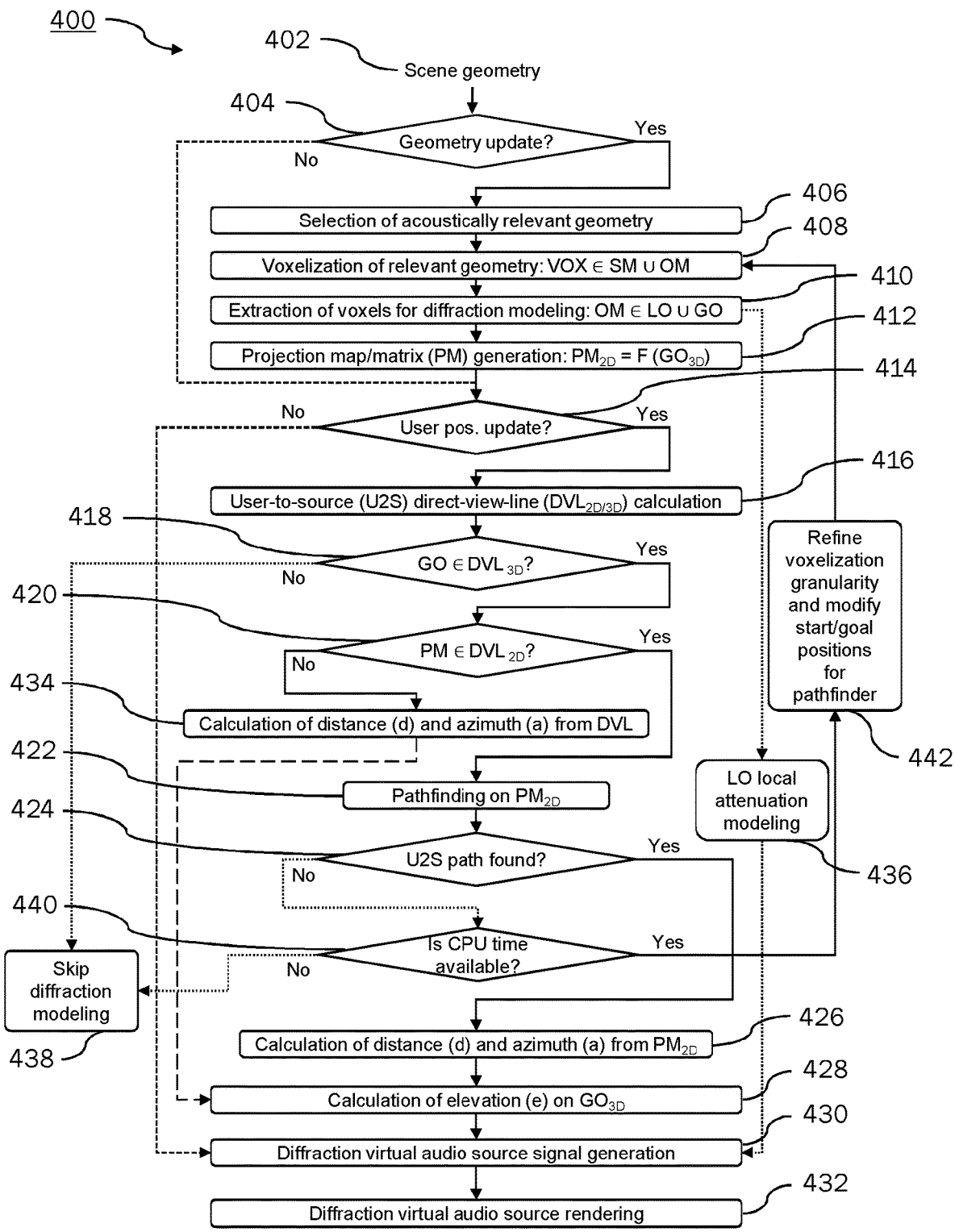
FIG. 4 illustrates a flow diagram of another example of a method of processing audio content for rendering in a three-dimensional audio scene.

At 224, it is checked whether a path has been found in step 222. If a path has been found (Yes), the method proceeds to 226. If no path has been found (No), the method proceeds to 238 and may not determine the parameters indicating a virtual source position of a virtual sound source. The method may then altogether skip diffraction modelling and/or audio rendering for the present listener position and the present source position. An alternative treatment of the case that no path is found will be described below with reference to FIG. 4.

Steps 226 and 228 generally relate to determining the parameters indicating the virtual source position based on the path determined in step 222.

In more detail, at 226 a distance (i.e., a radius) and an azimuth angle (i.e., a horizontal directional component) between the listener position and the virtual source position are determined based on the determined path.

The distance may be determined based on a path length of the determined path. For example, the distance may be determined as
- the length of the complete path on the projection map as determined in step 222;
- the length of the complete path on the projection map, adjusted according to the difference of the listener and source positions in their vertical coordinate (e.g., z-dimension) (i.e., their heights with respect to the horizontal plane); or
- the length of the complete path between the listener and the source extrapolated into the voxelized representation of the three-dimensional audio scene (e.g., GO voxels).

Incidentally, if the determined distance between the virtual source position and the listener position exceeds a maximum renderer distance of the renderer intended for use, the virtual source position may be set to the maximum render distance, and any surplus distance not yet accounted for may be encapsulated into an additional attenuation gain for the virtual sound source.

The azimuth angle may be determined by first identifying, starting from the two-dimensional projection of the listener position, a nearest direction change in the determined path. Then, the azimuth angle may be determined as an azimuth angle between the two-dimensional projection of the listener position (into the projection map) and the identified nearest direction change. For instance, the azimuth angle may be determined based on a relative position of respective grid elements of the projection map into which the two-dimensional projection of the listener position and the identified nearest direction change fall. Put differently, the azimuth angle may be determined based on a direction of the determined path, when starting from the listener position. In yet other words, the azimuth angle may be determined based on a direction in the projection map from the listener position to the first occluding grid element for the determined path, after which the path changes its direction. It is understood that the azimuth angle may be determined with reference to a predetermined reference direction, such as the x-dimension or the y-dimension in the coordinate system of the three-dimensional audio scene, for example.

Figure 3A:
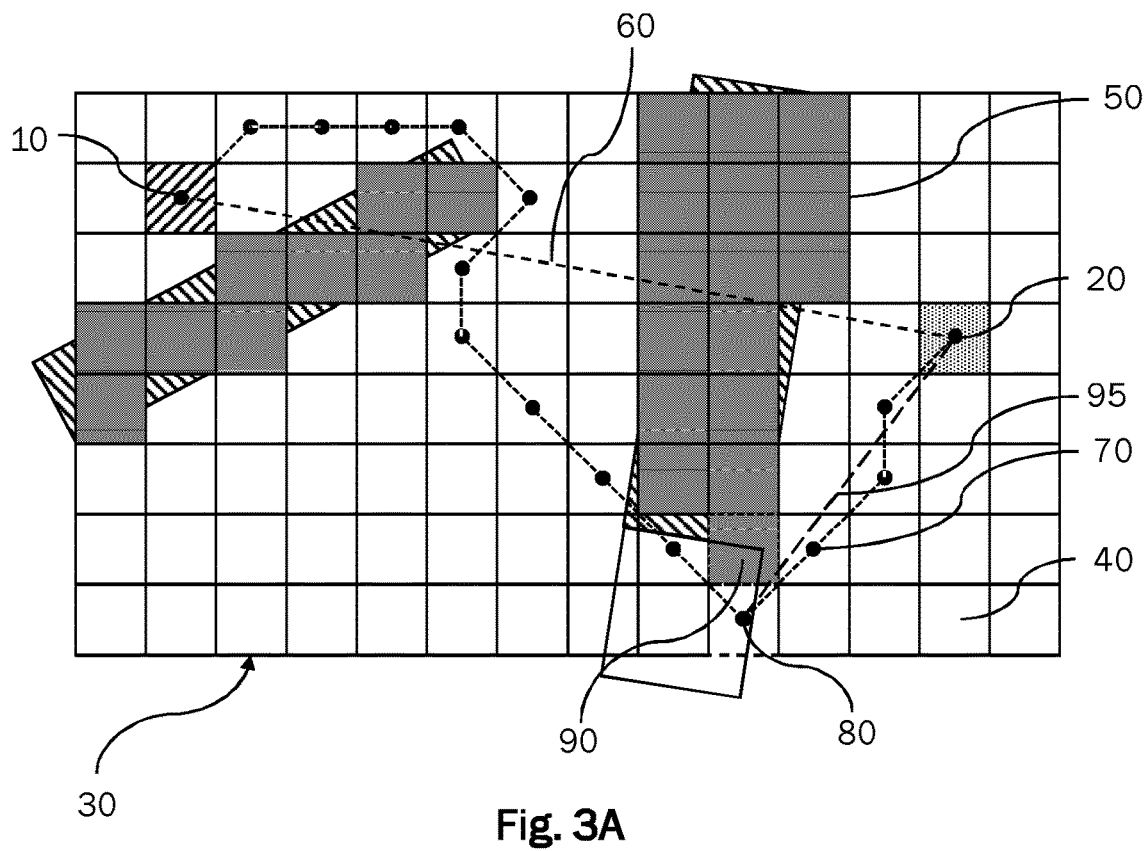
FIG. 3A and FIG. 3B illustrate examples of paths in two-dimensional projection maps.

FIG. 3A schematically illustrates an example of determining the azimuth angle for the virtual source position. The projection map 30 shown therein includes occluding grid elements 50 (shaded; i.e., grid elements representing respective horizontal positions in the audio scene and indicating that none of the voxels at that horizontal position in the voxelized representation is a voxel in which sound can propagate), as well as non-occluding grid elements 40 (i.e., grid elements representing respective horizontal positions in the audio scene and indicating that at least one of the voxels at that horizontal position in the voxelized representation is a voxel in which sound can propagate). For illustrative purposes, also horizontal projections of the occluding elements 140 of the audio scene are shown, although these projections are not part of the projection map 30. The two-dimensional projection 60 of the line of sight between the (two-dimensional projection of the) source position 10 and the (two-dimensional projection of the) listener position 20 into the projection map 30 is occluded by at least one of the occluding grid elements 50 of the projection map 30. Accordingly, path 70 between the source position 10 and the listener position 20 is determined by means of a pathfinding algorithm. That path 70 changes its direction behind occluding grid element 90. Accordingly, a position of the nearest direction change 80 of the path 70 is determined. The azimuth angle is then determined to indicate the direction 95 to the identified nearest direction change 80 of the path 70. This direction 95 typically differs from the direction 60 of the (two-dimensional projection of the) direct line of sight.

Figure 3B:
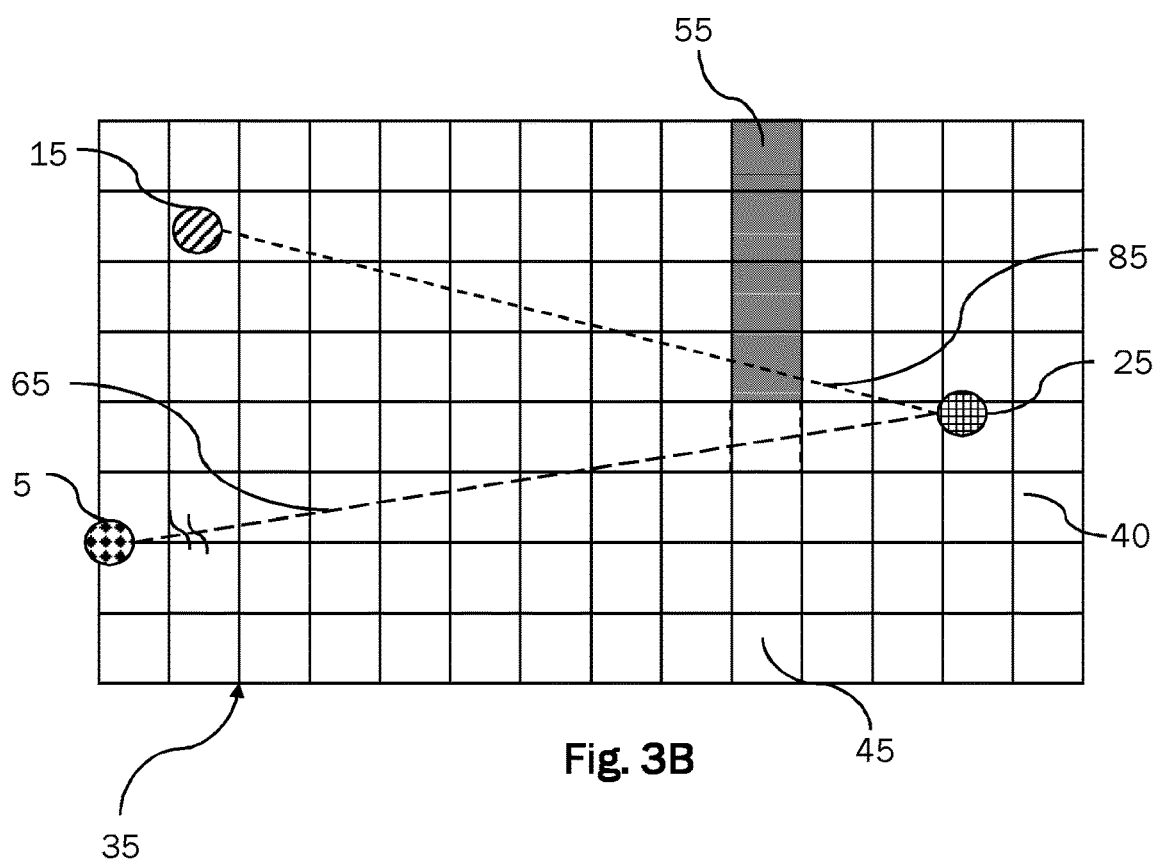

At 228, an elevation angle (i.e., a vertical directional component) between the listener position 120 and the virtual source position is determined based on the determined path and the voxelized representation. In particular, the elevation angle may be determined by first identifying, starting from the two-dimensional projection of the listener position, the nearest direction change in the determined path. This may proceed in analogy to step 226, or re-use the nearest direction change identified in step 226. Then, a volume element in the voxelized representation in which sound can propagate is determined at the horizontal position of the identified direction change. For instance, such a (non-occluding) voxel may be determined in the column of voxels at the horizontal position of the grid element including the identified nearest direction change. In particular, that (non-occluding) voxel may be determined at the horizontal position of the identified nearest direction change that has a vertical coordinate closest to that of the listener position. Finally, the elevation angle may be determined as an elevation angle between the listener position and the determined voxel. Put differently, the elevation angle may be determined based on a direction of the determined path, starting from the listener position, when extrapolated into the voxelized representation to the three-dimensional audio scene. It is understood that the elevation angle may be determined with reference to a predetermined reference plane, such as the horizontal plane onto which the voxelized representation is projected to generate the projection map, for example. FIG. 3B schematically illustrates an example of determining the elevation angle for the virtual source position. In particular, FIG. 3B illustrates a (vertical) section through the voxelized representation along a vertical section plane that is aligned with either of the two directions defined by the grid of the two-dimensional projection map and that intersects the location (e.g., voxel) of the nearest direction change 80 (closest to the two-dimensional projection of the listener position 20) of the determined path 70 between the listener position 20 and the source position 10. Unless the source position 10 and the listener position have a common horizontal voxel index (i.e., are arranged in the same horizontal row of the voxelized representation), either choice of direction defined by the grid of the two-dimensional projection map is adequate. If the two positions share a horizontal index, the vertical section plane should be chosen so that it intersects the direct line of sight between the source position 10 and the listener position 20. The vertical section includes occluding vertical grid elements 55 and non-occluding vertical grid elements 45.

In the present example, the vertical section plane is a plane that is orthogonal to the two-dimensional projection map of FIG. 3A and that includes the bottom horizontal row of voxels of FIG. 3A (i.e., the horizontal row of voxels including the voxel of the nearest direction change 80). The source position 10, the listener position 20, and the direct line of sight are projected onto the vertical section plane to their respective vertical projections 15, 25, and 85. In the present example, the vertical section includes four vertical occluding grid elements 55, which are arranged in a vertical column and which correspond to voxels representing the bearing-out of the occluding element 140 to the right in FIG. 1A.

To determine the elevation angle, a non-occluding vertical grid element 45 in the vertical section is identified that is at the same horizontal position as the nearest direction change 80. In the present example, the non-occluding vertical grid element immediately below the column of occluding vertical grid elements 55 is identified. In general, that non-occluding vertical grid element may be identified that is at the horizontal position of the nearest direction change 80 and that, for example, a) is closest to the vertical projection 85 of the line of sight, b) is closest to the vertical coordinate of the listener position 20, or c) corresponds to a voxel that is part of a largest contiguous subset of non-occluding voxels. The identified non-occluding vertical grid element is used to determine the elevation angle. For instance, a vertical projection of the elevation angle between the vertical projection 5 of the virtual source position and the vertical projection 25 of the listener position can be determined based on the horizontal and vertical distances between the identified non-occluding vertical grid element (e.g., its center) and the vertical projection 25 of the listener position. The actual elevation angle can then be determined based on the azimuth angle and the vertical projection of the elevation angle, for example by applying a trigonometric transformation based on a difference angle between the azimuth direction and the direction of the vertical section plane to the vertical projection of the elevation angle.

It is noted that the determination of the elevation angle as illustrated in FIG. 3B may use actual position coordinates of the vertical projections 15, 25 of the source position and the listener position (as illustrated by hatched and dashed circles), whereas the pathfinding as illustrated in FIG. 3A may refer only to respective voxels (voxel indices) containing these positions.

It is further noted that FIG. 3B shows the vertical projection 5 of the virtual source position at a greater distance from the vertical projection 25 of the listener position than the vertical projection 15 of the source position, which may be due to the fact that the length of the determined path 70 exceeds the length of the direct line of sight 60.

In summary, a non-occluding (i.e., non-GO) voxel is identified at the horizontal position of the identified nearest direction change 80. This non-occluding voxel may be, for example, the non-occluding voxel that is closest in vertical coordinate (e.g., height) to the listener position 20, or the non-occluding voxel that is closest to the direct line of sight, or the non-occluding voxel that is part of a largest contiguous subset of non-occluding voxels (e.g., that belongs to a largest opening in a wall). The elevation angle is then determined based on the identified non-occluding voxel at the horizontal position of the identified nearest direction change 80.

Importantly, the above determination of the azimuth angle and the elevation angle only requires knowledge of the last segment of the determined path, between the nearest direction change 80 and the listener position 20. Knowledge of any further sections of the path is not required (and is not relevant) for the determination of these angles. If any, these further sections are referred to for determining the radius (or distance) to the virtual source position.

As noted above, if the calculated line of sight intersects a voxel in the voxelized representation by which sound is occluded (e.g., a GO voxel), but the two-dimensional projection of the line of sight onto the horizontal plane does not intersect a grid element in the projection map indicating that none of the volume elements at that horizontal position in the voxelized representation is a volume element in which sound can propagate, the method proceeds to 234. At 234, a distance (i.e., radius) and an azimuth angle (i.e., horizontal directional component) between the listener position and the virtual source position are determined based on the two-dimensional projection of the line of sight onto the horizontal plane. The distance may be determined in the same manner as in step 226, however replacing the determined path by the two-dimensional projection of the line of sight. The azimuth angle may be determined based on a direction of the two-dimensional projection of the line of sight, when seen from the listener position. Afterwards, the method proceeds to 228 at which the elevation angle is determined. At this time, the elevation angle is determined based on the calculated line of sight and the voxelized representation. This may be done in the following manner. First, the occluding voxel (e.g., GO voxel) of the voxelized representation is identified that had intersected the line of sight. If there is more than one intersecting occluding voxel, the one closest to the listener position is chosen. Put differently, this amounts to identifying, starting from the listener position, a nearest voxel (volume element) that is intersected by the calculated line of sight and by which sound is occluded. Then, for that occluding voxel, the nearest non-occluding voxel at the same horizontal position (e.g., above or below the occluding voxel) is determined. This may amount to determining, at the horizontal position of the identified voxel, a volume element in the voxelized representation in which sound can propagate. Finally, the elevation angle is determined as an elevation angle between the listener position and the determined non-occluding volume element.

At 230, the virtual source signal (e.g., waveform) for the virtual source at the determined virtual source position is determined based on the source signal (e.g., waveform) of the sound source. For instance, the virtual source signal may be the original waveform (i.e., source signal) with imposed modifications (e.g., gains, filters, etc.). These modifications may be chosen among the following options:

none
 gains/filters influenced by the virtual source's local environment (e.g., late reverberation)
 gains/filters influenced by all environments Put differently, the original source signal may be used as the virtual source signal, or the virtual source signal may be generated by applying gains and/or filters to the source signal. Applying filters to the source signal may include, for example, applying reverb corresponding to an area of the (original) source position, applying reverb corresponding to an area of the virtual source position, or in general applying reverb corresponding to one or more areas along the determined path.

At 232, rendering (e.g., 3DoF rendering) is applied to the virtual source at the virtual source position. In general, this step may be said to involve rendering the virtual source signal from the virtual source position to the listener position. Further, any conventional processing steps for audio sources, including any post-processing steps, may be performed at this point.

At 238, which is performed if the calculated line of sight does not intersect a voxel in the voxelized representation by which sound is occluded (e.g., a GO voxel) or if no path is found in the projection map, diffraction modelling is skipped. If there is a direct line of sight between the source position and the listener position that is not occluded by any occluding voxels (e.g., GO voxels), diffraction of sound by the three-dimensional audio scene does not need to be taken into account when seeking to provide a realistic listening experience and lifelike perception of sound propagation in the three-dimensional audio scene. If no path is found, sound from the sound source may not be rendered at all.

It is understood that the process flow of steps 214 to 232 together with steps 234, 236, and 238 of method 200 may be performed for each of a plurality of source positions and/or listener positions (e.g., to each of a plurality of pairs of a source position and a listener position).

In method 200 described above, the parameters indicating a virtual source position of a virtual sound source may not be determined if no path is found (No at step 224). The method 200 then may altogether skip diffraction modelling and/or audio rendering for the present listener position and the present source position. A method 400 providing an alternative treatment of the case that no path is found will now be described with reference to FIG. 4.

Steps 402, 404, 406, 408, 410, 412, 414, 416, 418, 420, 422, and 434 of method 400 may proceed in the same manner as steps 202, 204, 206, 208, 210, 212, 214, 216, 218, 220, 222, and 234, respectively, of method 200 described above, and respective statements made above may apply also here.

At 424, it is checked whether a path has been found in step 422. If a path has been found (Yes), the method proceeds to 426. If no path has been found (No), the method proceeds to 440.

Steps 426, 428, 430, and 432 of method 400 may then proceed in the same manner as steps 226, 228, 230, and 232, respectively, of method 200 described above, and respective statements made above may apply also here. Likewise, step 436 may proceed in the same manner as step 236 described above.

At 440, it is checked whether CPU time is available. This step may be performed by a real-time resource managing application (real-time resource manager), for example. It may be assumed that a certain cycle (time period) is available for determining the virtual source position and performing the actual rendering. This cycle or time period may relate to (e.g., may be derivable from) an update rate or refresh rate of the rendering. Then, it may be checked in each cycle whether sufficient time (CPU time) is available in that cycle for performing another repetition of the voxelization and subsequent steps. This may be based on an estimate of the time that would be needed for such repetition, for example based on characteristics of the three-dimensional audio scene and/or previous amounts of time needed at a given granularity of voxelization. If it is found that no CPU time is available (No), the method proceeds to 438, which step may be performed in the same manner as step 238 described above. If CPU time is found to be available (Yes), the method proceeds to 442.

At 442, the granularity of voxelization is refined. This corresponds to reducing the size (e.g., edge length) of the voxels. For example, the edge length of the voxels may be halved at this point, so that each voxel is split into eight smaller voxels for the next repetition. In general, the size (e.g., edge length) may be reduced in accordance with a predefined ratio. Afterwards, the method returns to 408 to perform voxelization of the three-dimensional audio scene with the refined granularity. In analogy to the above, this step may be replaced by obtaining a voxelized representation of the three-dimensional audio scene with the refined granularity. For example, such refined voxelized representation may be read from a storage memory, or it may be extracted from a bitstream (possibly subsequent to requesting the refined voxelized representation at the applicable refined granularity from a source device, such as an encoder, for example).

The remaining steps then proceed as described above. Therein, it is understood that also the refined two-dimensional projection map may be obtained, for example by reading it from a storage memory of extracting it from a bitstream (possibly subsequent to requesting the refined two-dimensional projection map at the applicable refined granularity from a source device, such as an encoder, for example).

Notably, the refinement of granularity of voxelization may be repeated (possibly multiple times) as long as it is determined that no path has been found at 424 and CPU time is found to be available at 440. A further criterion that may be applied at this stage is to check whether a predetermined minimum granularity of voxelization has been reached. If the minimum granularity has been reached, the method may proceed as if no CPU time had been found to be available at step 440.

In yet another implementation, the refinement of granularity of the voxelized representation may be repeated (i.e., iteratively performed) as long as CPU time is available, regardless of whether or not a path has been found. This may be implemented by changing the order of steps 440 and 424, i.e., first checking whether CPU time is available at 440, and only after no CPU time is found to be available (Yes), checking whether a path has been found at 424. It is understood that in this case, if no CPU time is found to be available at step 440 (No), the method would proceed to step 424. Then, at step 424, if no path has been found (No), the method would proceed to step 438. A further criterion that may be applied at step 440 is to check whether a predetermined minimum granularity of voxelization has been reached.

In addition to refining the granularity of voxelization at step 442, the present implementation may modify the parameters (e.g., start and/or goal positions) of the pathfinding algorithm based on paths that have been found earlier at coarser granularities of voxelization.

The granularity of voxelization (e.g., the size or edge length of the voxels) may be reset to a predefined (e.g., default) value in the above implementations whenever an update of geometry is detected at step 404. In some implementations, this may be the only instance that the granularity of voxelization is reset (or generally, coarsened).

While a method of processing audio content has been described above, it is understood that the present disclosure likewise relates to apparatus and devices adapted to perform the described method (e.g., encoders, decoders, renderers, playback devices, etc.), to computer programs including instructions suitable to cause a device with processing capability to perform the described method, and to computer-readable storage media storing such computer programs.

Figure 5:
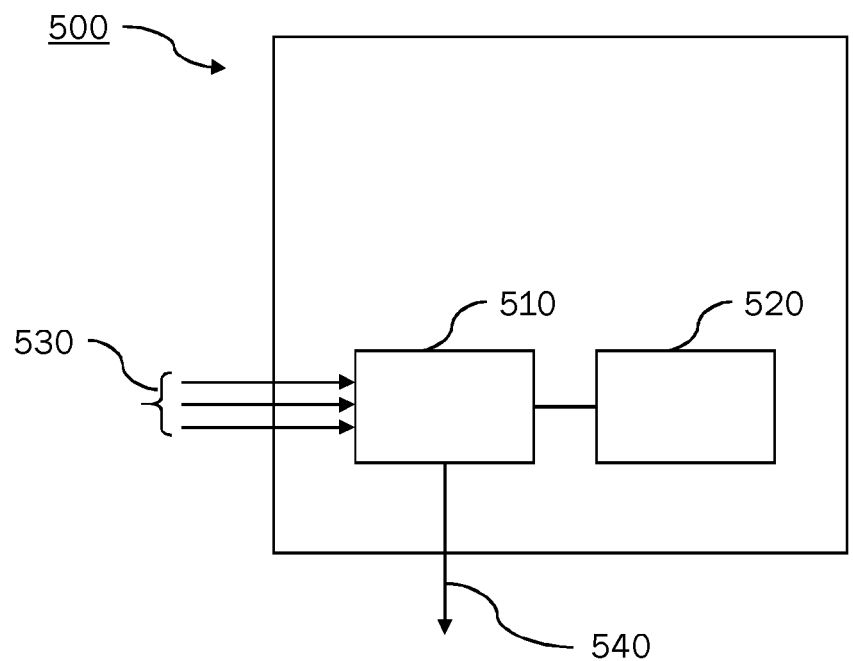
FIG. 5 schematically illustrates an example of an apparatus implementing the method of processing audio content for rendering in a three-dimensional audio scene.

FIG. 5 shows an example of an apparatus 500 adapted to perform the described method. The apparatus 500 comprises a processor 510 and a memory 520 that is coupled to the processor 510 and that stores instructions for the processor 510. The processor 510 is adapted to perform the method(s) described above. The apparatus 500 may receive input 530 including, for example, the audio content (including indications of the source signal and the source position) and an indication of the three-dimensional audio scene, and may generate output 540 including, for example, indications of the virtual source signal and the virtual source position, or a rendered audio signal.

It is noted that the proposed method may be performed by an encoder or a decoder, or may be distributed between the encoder and the decoder. In the first case, the encoder may generate a representation of the rendered (virtual) sound signal as an output. In the second case, the decoder may generate the voxelized representation and the two-dimensional projection map on its own, if its computational capability permits. Alternatively, in the third case, the voxelized representation and the two-dimensional projection map may be generated by the encoder (possibly at different granularities of voxelization) and may be provided to the decoder, for example as part of a bitstream. Then, the decoder would obtain the voxelized representation and the two-dimensional projection map, for example by extracting them from the bitstream, and proceed with the further steps of the method(s) described above. Also mixed cases are feasible in which the voxelized representation is obtained (e.g., from the encoder side) and the two-dimensional projection map is generated by the decoder, based on the obtained voxelized representation.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

One example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment.

Furthermore, the particular features, structures or characteristics may be combined in any suitable manner, as would be apparent to one of ordinary skill in the art from this disclosure, in one or more example embodiments.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

While there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The invention claimed is:

1. A method of processing audio content for rendering in a three-dimensional audio scene, wherein the audio content comprises a sound source at a source position, the method comprising:
obtaining a voxelized representation of the three-dimensional audio scene, wherein the voxelized representation indicates volume elements in which sound can propagate and volume elements by which sound is occluded;
obtaining a two-dimensional projection map for the audio scene, wherein the two-dimensional projection map is related to the voxelized representation by a projection operation that projects onto a horizontal plane, wherein the projection map comprises a grid with each element of the grid representing a horizontal position in the audio scene and indicating whether at least one volume element at that horizontal position in the voxelized representation is a volume element in which sound can propagate; and
determining parameters indicating a virtual source position of a virtual sound source based on the source position, a listener position, and the projection map, to simulate, by rendering a virtual source signal from the virtual source position, an impact of acoustic diffraction by the three-dimensional audio scene on a source signal of the sound source at the source position.

2. The method according to claim 1, wherein obtaining the two-dimensional projection map comprises applying the projection operation to the voxelized representation.

3. The method according to claim 1, wherein determining the parameters indicating the virtual source position comprises:
applying a path finding algorithm to the projection map to determine a path in the projection map between a two-dimensional projection of the source position and a two-dimensional projection of the listener position, along grid elements indicating that at least one volume element at a respective horizontal position in the voxelized representation is a volume element in which sound can propagate.

4. The method according to claim 1, wherein determining the parameters indicating the virtual source position comprises:
calculating a line of sight between the source position and the listener position in the three-dimensional audio scene;
if the calculated line of sight intersects a volume element in the voxelized representation by which sound is occluded, and if a two-dimensional projection of the line of sight onto the horizontal plane intersects a grid element in the projection map indicating that none of the volume elements at that horizontal position in the voxelized representation is a volume element in which sound can propagate:
applying a path finding algorithm to determine a path in the projection map between a two-dimensional projection of the source position and a two-dimensional projection of the listener position, along grid elements indicating that at least one volume element at a respective horizontal position in the voxelized representation is a volume element in which sound can propagate; and
determining the parameters indicating the virtual source position based on the determined path.

5. The method according to claim 3, further comprising, if the path finding algorithm fails to identify a path in the projection map between the two-dimensional projection of the source position and the two-dimensional projection of the listener position:
obtaining a refined voxelized representation and a refined two-dimensional projection map; and
applying the path finding algorithm to determine a path in the refined projection map between the two-dimensional projection of the source position and the two-dimensional projection of the listener position, along grid elements indicating that at least one volume element at a respective horizontal position in the refined voxelized representation is a volume element in which sound can propagate,
wherein the refined two-dimensional projection map is related to the refined voxelized representation by the projection operation that projects onto the horizontal plane; and
wherein the volume elements of the refined voxelized representation have a smaller edge length than the volume elements of the voxelized representation.

6. The method according to claim 3, wherein determining the parameters indicating the virtual source position comprises:
determining a distance and an azimuth angle between the listener position and the virtual source position based on the determined path.

7. The method according to claim 6, wherein the distance is determined based on a path length of the determined path; and/or
wherein determining the azimuth angle comprises:
identifying, starting from the two-dimensional projection of the listener position, a nearest direction change in the determined path; and
determining the azimuth angle as an azimuth angle between the two-dimensional projection of the listener position and the identified nearest direction change.

8. The method according to claim 3, wherein determining the parameters indicating the virtual source position comprises:
determining an elevation angle between the listener position and the virtual source position based on the determined path and the voxelized representation.

9. The method according to claim 8, wherein determining the elevation angle comprises:
identifying, starting from the two-dimensional projection of the listener position, a nearest direction change in the determined path;
determining, at the horizontal position of the identified direction change, a volume element in which sound can propagate in the voxelized representation; and
determining the elevation angle as an elevation angle between the listener position and the determined volume element.

10. The method according to claim 3, wherein determining the parameters indicating the virtual source position comprises:
calculating a line of sight between the source position and the listener position in the three-dimensional audio scene;
if the calculated line of sight intersects a volume element in the voxelized representation by which sound is occluded, and if a two-dimensional projection of the line of sight onto the horizontal plane does not intersect a grid element in the projection map indicating that none of the volume elements at that horizontal position in the voxelized representation is a volume element in which sound can propagate:

determining a distance and an azimuth angle between the listener position and the virtual source position based on the two-dimensional projection of the line of sight onto the horizontal plane.

11. The method according to claim 10, wherein determining the parameters indicating the virtual source position further comprises:
determining an elevation angle between the listener position and the virtual source position based on the line of sight and the voxelized representation; and optionally wherein determining the elevation angle comprises:
identifying, starting from the listener position, a nearest volume element that is intersected by the calculated line of sight and by which sound is occluded;
determining, at the horizontal position of the identified volume element, a volume element in which sound can propagate in the voxelized representation; and
determining the elevation angle as an elevation angle between the listener position and the determined volume element.

12. The method according to claim 1, wherein obtaining the voxelized representation of the three-dimensional audio scene comprises:
receiving a meshed representation of the three-dimensional audio scene; and
applying a voxelization algorithm to the meshed representation of the three-dimensional audio scene to generate the voxelized representation; and optionally
wherein obtaining the voxelized representation of the three-dimensional audio scene further comprises:
removing, from the generated voxelized representation, any voxels that correspond to local occluders, wherein local occluders represent objects in the three-dimensional audio scene that are expected to not have an impact on large-scale directivity of sound propagation.

13. The method according to claim 1, further comprising:
determining the virtual source signal from the source signal of the sound source; and
rendering the virtual source signal from the virtual source position to the listener position; and optionally
wherein determining the virtual source signal comprises one of:
using the source signal as the virtual source signal; or
applying a filter to the source signal to generate the virtual source signal.

14. The method according to claim 1, wherein the volume elements of the voxelized representation indicate occlusion coefficients with values between a first value indicating free sound propagation and a second value indicating full occlusion; and
generating the two-dimensional projection map comprises a truncation operation so that grid elements of the projection map either indicate free sound propagation or full occlusion.

15. The method according to claim 1, wherein obtaining the voxelized representation followed by obtaining the projection map is performed whenever an update of the three-dimensional audio scene occurs; and/or
wherein determining the parameters indicating the virtual source position is performed whenever an update of the source position or the listener position occurs.

16. A non-transitory computer readable medium having stored thereon executable instructions to cause a computer to perform the method of claim 1.

17. An apparatus for processing audio content for rendering in a three-dimensional audio scene, wherein the audio content comprises a sound source at a source position, the apparatus comprising:
a first processor for obtaining a voxelized representation of the three-dimensional audio scene, wherein the voxelized representation indicates volume elements in which sound can propagate and volume elements by which sound is occluded;
a second processor for obtaining a two-dimensional projection map for the audio scene, wherein the two-dimensional projection map is related to the voxelized representation by a projection operation that projects onto a horizontal plane, wherein the projection map comprises a grid with each element of the grid representing a horizontal position in the audio scene and indicating whether at least one volume element at that horizontal position in the voxelized representation is a volume element in which sound can propagate; and
a third processor for determining parameters indicating a virtual source position of a virtual sound source based on the source position, a listener position, and the projection map, to simulate, by rendering a virtual source signal from the virtual source position, an impact of acoustic diffraction by the three-dimensional audio scene on a source signal of the sound source at the source position.

* * * * *

UNITED STATES PATENT AND TRADEMARK OFFICE
CERTIFICATE OF CORRECTION

PATENT NO. : 12,245,017 B2
APPLICATION NO. : 17/914736
DATED : March 4, 2025
INVENTOR(S) : Terentiv et al.

Page 1 of 1

It is certified that error appears in the above-identified patent and that said Letters Patent is hereby corrected as shown below:

In the Claims

Column 22, Line 54, Claim 10, delete "claim 3," and insert --claim 1,--

Signed and Sealed this
Sixth Day of May, 2025

Coke Morgan Stewart
*Acting Director of the United States Patent and Trademark Office*